US012123536B2

(12) United States Patent
Raedlinger

(10) Patent No.: US 12,123,536 B2
(45) Date of Patent: Oct. 22, 2024

(54) ELASTIC TUBULAR LINER FOR REHABILITATING A PIPELINE

(71) Applicant: Raedlinger Primus Line GmbH, Cham (DE)

(72) Inventor: Werner Raedlinger, Cham (DE)

(73) Assignee: Raedlinger primus line GmbH, Cham (DE)

( * ) Notice: Subject to any disclaimer, the term of this patent is extended or adjusted under 35 U.S.C. 154(b) by 0 days.

(21) Appl. No.: 17/698,781

(22) Filed: Mar. 18, 2022

(65) Prior Publication Data

US 2022/0299152 A1 Sep. 22, 2022

(30) Foreign Application Priority Data

Mar. 22, 2021 (EP) ..................................... 21163967

(51) Int. Cl.
*F16L 55/165* (2006.01)
*B32B 1/08* (2006.01)
(Continued)

(52) U.S. Cl.
CPC ............ *F16L 55/1654* (2013.01); *B32B 1/08* (2013.01); *B32B 5/024* (2013.01); *B32B 27/12* (2013.01);
(Continued)

(58) Field of Classification Search
CPC ........ F16L 55/1654; B32B 1/08; B32B 5/024; B32B 27/12; B32B 2262/02; B32B 2307/51; B32B 2597/00
(Continued)

(56) References Cited

U.S. PATENT DOCUMENTS

| 4,576,205 A | 3/1986 | Morinaga et al. ...... F16L 55/16 138/98 |
| 4,684,556 A * | 8/1987 | Ohtsuga ............... D03D 15/283 428/36.1 |

(Continued)

FOREIGN PATENT DOCUMENTS

| AR | 206753 A1 | 1/1976 |
| CA | 2126157 A1 | 6/1994 |

(Continued)

OTHER PUBLICATIONS

Office action of the Russian Patent Office dated Nov. 9, 2022, in the related Russian patent application RU 2022107326/12 citing references A and G-L and an English translation of the Office action (11 pages).

(Continued)

*Primary Examiner* — David R Deal
(74) *Attorney, Agent, or Firm* — Imperium Patent Works; T. Lester Wallace

(57) ABSTRACT

A lining tube for rehabilitating pipelines includes inner, outer, and middle tube layers. The middle tube layer includes a seamless fabric formed from warp threads and weft threads. The warp threads run in a longitudinal direction and the weft threads run in a circumferential direction relative to the lining tube. The weft threads exhibit a greater elasticity than do the warp threads. The lining tube is capable of expanding in diameter by up to 50% from a pressureless state to a pressurized state without tearing or rupturing. A method for retrofitting a pipeline involves pulling a lining tube into the pipeline, expanding the lining tube using pressurized air so as to press an outer tube layer of the lining tube against an inside surface of the pipeline, and maintaining the lining tube in a pressurized state using the pressurized air until a resin in the lining tube cures and hardens.

20 Claims, 3 Drawing Sheets

(51) Int. Cl.
  *B32B 5/02* (2006.01)
  *B32B 27/12* (2006.01)
(52) U.S. Cl.
  CPC ... *B32B 2262/0269* (2013.01); *B32B 2307/51* (2013.01); *B32B 2597/00* (2013.01)
(58) Field of Classification Search
  USPC .......................................................... 138/97
  See application file for complete search history.

(56) References Cited

U.S. PATENT DOCUMENTS

| | | | | |
|---|---|---|---|---|
| 4,989,643 | A * | 2/1991 | Walton | F16L 11/085 138/124 |
| 5,271,433 | A | 12/1993 | Schwert et al. | F16L 55/16 138/98 |
| 5,705,446 | A | 1/1998 | Fujishiro et al. | D03D 442/260 |
| 6,129,119 | A * | 10/2000 | Schwert | C07D 401/04 264/269 |
| 6,508,276 | B2 | 1/2003 | Rädlinger et al. | F16L 11/112 138/125 |
| 9,719,197 | B2 | 8/2017 | Tsuchikura et al. | D03D 3/02 |
| 2002/0162597 | A1* | 11/2002 | Radlinger | F16L 11/02 138/145 |
| 2004/0035485 | A1 | 2/2004 | Gleim et al. | F16L 9/14 138/141 |
| 2007/0062595 | A1* | 3/2007 | Bhatnagar | B32B 27/12 138/123 |
| 2007/0180129 | A1 | 8/2007 | Tolmie et al. | H04W 4/029 709/230 |
| 2010/0243091 | A1 | 9/2010 | D'Hulster | F16L 55/163 138/97 |
| 2014/0261845 | A1* | 9/2014 | Nagy | F16L 33/01 138/137 |
| 2015/0369399 | A1* | 12/2015 | Fyfe | F16L 55/1656 138/97 |
| 2018/0003331 | A1 | 1/2018 | Morissette et al. | F16L 55/165 |
| 2020/0316925 | A1 | 10/2020 | Reichel | B32B 27/12 |
| 2021/0388935 | A1 | 12/2021 | Stark | F16L 55/165 |
| 2022/0299152 | A1 | 9/2022 | Raedlinger | F16L 55/165 |

FOREIGN PATENT DOCUMENTS

| | | |
|---|---|---|
| CN | 101846219 A | 3/2010 |
| CN | 103465478 A | 9/2013 |
| CN | 110307439 A | 3/2019 |
| DE | 3505107 A1 | 8/1985 |
| DE | 9105040 U1 | 4/1991 |
| DE | 19941669 C2 | 9/1999 |
| DE | 202012103776 U1 | 10/2012 |
| DE | 102016109843 A1 | 11/2017 |
| EP | 0510784 B1 | 3/1998 |
| EP | 4063707 A1 | 3/2021 |
| GB | 1587243 | 6/1977 |
| RU | 2227860 C2 | 4/2004 |
| RU | 2663401 C1 | 8/2018 |
| SU | 542890 A1 | 1/1977 |

OTHER PUBLICATIONS

Office action of the Chinese Patent Office dated May 30, 2023, in the related Chinese patent application CN 202210286705.9 citing references A-E and I-O (7 pages).

Extended European Search Report dated Aug. 27, 2021 from the European Patent Office in the priority European application EP 21163967.9 citing references A-D above (8 pages).

English translation of the EESR dated Aug. 27, 2021 from the European Patent Office listed in E above. (5 pages).

Office action of the Canadian Patent Office in the related Canadian patent application CA 3,152,598 dated Jun. 20, 2023 citing references B-D (6 pages).

Office action of the Canadian Patent Office in the related Canadian patent application CA 3,152,598 dated Mar. 13, 2024 citing references B-C (5 pages).

* cited by examiner

|  | FABRIC TUBE BASED ON POLYPHENYLENE SULPHIDE |
|---|---|
| INNER TUBE LAYER | THERMOPLASTIC POLYURETHANE (TPU): 2 mm |
| OUTER TUBE LAYER | THERMOPLASTIC POLYURETHANE (TPU): 2 mm |
| FABRIC FIBER | WARP THREADS: ARAMID; WEFT THREADS: PPS |
| WARP THREAD THICKNESS | 8,000 dtex |
| WEFT THREAD THICKNESS | 18,000 dtex |
| FABRIC TYPE | TWILL |
| BURSTING PRESSURE | 5-30 bar |
| TUBE LENGTH | 4,000 m |

FIG. 6

ELASTIC TUBULAR LINER FOR REHABILITATING A PIPELINE

CROSS REFERENCE TO RELATED APPLICATION

This application is based on and hereby claims the benefit under 35 U.S.C. § 119 from European Patent Application No. EP 21163967.9, filed on Mar. 22, 2021, in the European Patent Office. This application is a continuation-in-part of European Patent Application No. EP 21163967.9, the contents of which are incorporated herein by reference.

TECHNICAL FIELD

The present invention relates to a lining tube constructed from at least three tube layers, in particular for the rehabilitation, retrofitting, reinforcement and/or supplementation of fluid-carrying systems. The lining tube includes at least one inner tube layer, at least one middle tube layer exhibiting a seamless fabric formed of warp threads and weft threads, the warp threads extending in the longitudinal direction and the weft threads extending in the circumferential direction of the lining tube, and at least one outer tube layer. Furthermore, the invention relates to a pressure pipeline section with this lining tube as well as methods for rehabilitating an existing fluid line that is already laid and for supplementing a (newly laid) pressure pipeline using the lining tube.

BACKGROUND

The so-called fabric tube relining method is used for pipe systems that are deployed, for example, for the rehabilitation of existing fluid pipelines, such as existing fresh water pipelines or waste water pipelines. In this process, a fabric tube (a so-called inliner) with a resin-impregnated inner layer is inverted and inserted into the pipe to be rehabilitated so that the resin-impregnated layer is on the outside. By applying pressure, the resin-impregnated outer layer is made to stick to the inside of the fluid line. In this way, pipelines in need of rehabilitation can be rehabilitated.

In this respect, DE102016109843A1, for example, describes a lining tube for the rehabilitation of fluid-carrying systems with an inner film tube based on a thermoplastic material, an outer film tube based on a thermoplastic material and at least one fiber tube impregnated with a curable resin between the inner and outer film tube based on a composite material made of industrially produced inorganic fibers, natural fibers or mineral fibers and synthetic fibers.

However, such known fiber tubes impregnated with curable resin have the disadvantage that the rehabilitation tube has to be firmly bonded to the surface of the existing fluid line. Clean and reliable bonding requires extremely complex pre-machining of the metal surface on the inside of the existing fluid line (cleaning, sandblasting, deburring), which involves very high costs. Due to the type of material used, this rehabilitation tube has a low level of gas impermeability. As a result of this, a bonding defect can result in a build-up of gas pressure between the pipe and the tube, which can cause the rehabilitation tube to become detached. The insertion of the rehabilitation tube into the existing pipe by the inverting process using compressed air and a reversion chamber also limits the rehabilitation length to a maximum of 250 meters.

For this reason, as disclosed for example by DE19941669C2, other fabric tubes are known that can be used for high-pressure fluid lines with a fabric made of high-performance fibers formed of warp and weft threads, the fabric being positioned between an inner and an outer coating of thermoplastic material. Further state of the art is familiar from U.S. Pat. No. 4,576,205 and DE9105040U1.

Although these well-known fabric tubes can be used to reliably rehabilitate pressure pipelines, they also have disadvantages. Known lining tubes can only be used to a relatively limited extent in pressure pipelines with more widely fluctuating diameters. Particularly in the case of relatively widely varying internal diameters of the existing fluid lines caused by corrosion or previous patching work, it is necessary for the lining tube to adapt to these diameter variations without risking damage to the layers, such as that of the fabric, in the event of pressure load. The lining tube is also subject to relatively high radial forces in the area of connectors used to join two pressure pipeline sections. As a result of this, it has often been necessary up to now to provide different lining tubes with adapted diameters for different diameters of the systems to be rehabilitated.

It is therefore the object of the present invention to provide a lining tube that is designed to be more resistant to varying diameters in the fluid-carrying systems that are to be supplemented, while at the same time requiring the least possible installation effort.

SUMMARY

The invention relates to a lining tube used for rehabilitating fluid-carrying systems, such as high pressure pipelines. The lining tube is constructed from at least three tube layers including an inner tube layer, a middle tube layer, and an outer tube layer. The middle tube layer includes a seamless fabric formed from warp threads and weft threads. The warp threads run in the longitudinal direction, and the weft threads run in the circumferential direction of the lining tube. The weft threads exhibit a greater elasticity than do the warp threads. The invention also relates to a pressure pipeline section that includes the novel lining tube, as well as to a method for (i) rehabilitating an existing fluid line that is already laid, or (ii) supplementing a new pressure pipeline using the lining tube.

In one embodiment, a lining tube for rehabilitating pipelines includes an inner tube layer, an outer tube layer, and a middle tube layer. The middle tube layer includes a seamless fabric formed from warp threads and weft threads. The warp threads run in a longitudinal direction, and the weft threads run in a circumferential direction relative to the lining tube. The weft threads exhibit a greater elasticity than do the warp threads, for example, two to twenty times greater. The weft threads contain fibers that include polyphenylene sulphide. The lining tube is capable of expanding in diameter by up to 50% from a pressureless state to a pressurized state without tearing or rupturing.

In another embodiment, a pipeline section includes a lining tube and an outer pipe with an inside surface. The lining tube includes an inner tube layer, an outer tube layer, and a middle tube layer that includes a fabric formed from warp threads and weft threads. The warp threads run in a longitudinal direction relative to the lining tube, and the weft threads run in a circumferential direction relative to the lining tube. The weft threads exhibit a greater elasticity than do the warp threads. The outer tube layer contacts the inside surface of the outer pipe.

In yet another embodiment, a method for retrofitting a pipeline involves pulling a lining tube into the pipeline. The lining tube is then expanded using pressurized air so as to press an outer tube layer of the lining tube against an inside surface of the pipeline. The lining tube is maintained in a pressurized state using the pressurized air until a resin in the lining tube cures and hardens. The outer tube layer remains in contact with the inside surface of the outer pipe even after the pressurized air is removed. The lining tube comprises an inner tube layer, the outer tube layer, and a middle tube layer that includes a fabric formed from warp threads and weft threads. The warp threads run in a longitudinal direction relative to the lining tube, and the weft threads run in a circumferential direction relative to the lining tube. The weft threads exhibit a greater elasticity than do the warp threads.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 6 is a table of attributes of the lining tube of FIG. 1.

DETAILED DESCRIPTION

Figure 1:
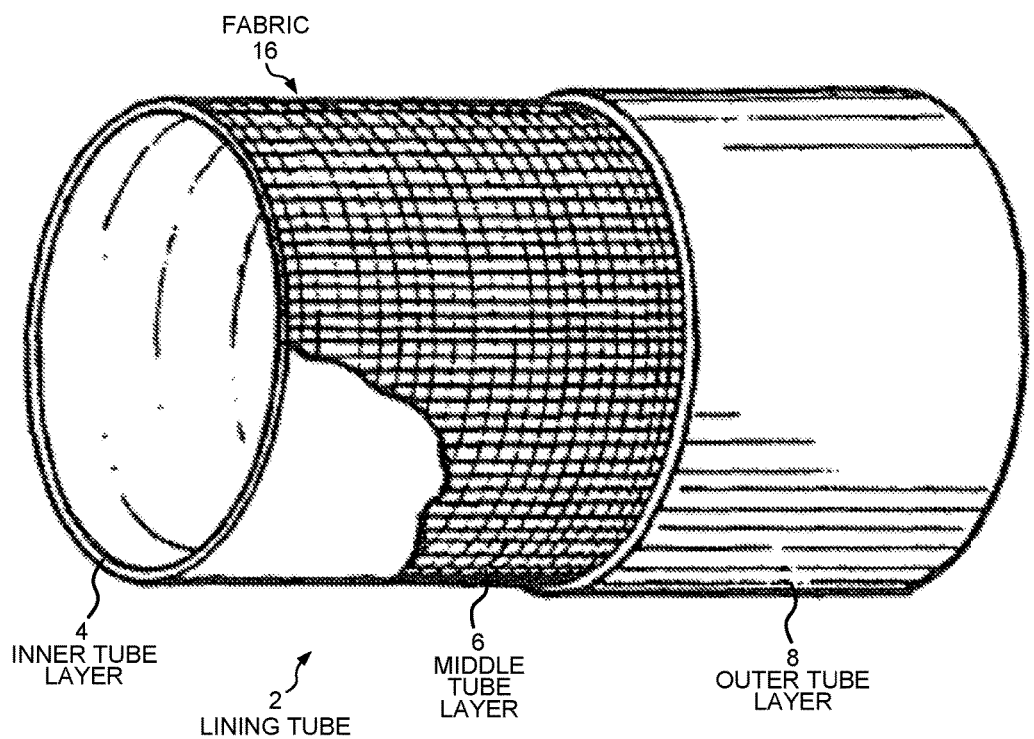
FIG. 1 is a perspective partial sectional view of a lining tube that has a three-layer structure.

Reference will now be made in detail to some embodiments of the invention, examples of which are illustrated in the accompanying drawings.

A lining tube is designed to withstand the radial forces generated at the changing diameters in fluid-carrying systems by using weft threads that exhibit a greater elasticity than the warp threads. The differing elasticity of the weft threads compared to the warp threads provides a lining tube whose flexibility is significantly increased in the radial direction. This allows pressure pipelines having larger deviations in diameter in relation to the nominal diameter to be rehabilitated, retrofitted or supplemented. The fabric of the lining tube is not damaged even after a renewed pressure load of the pressure pipeline provided with the lining tube and is therefore designed to be as durable as possible. At the same time, warp threads are used in the fabric of the lining tube that are as low-stretch/stiff as possible in order to allow the lining tube to be pulled into the existing pressure pipeline.

In one embodiment, the weft threads exhibit an elasticity that is two to twenty times, preferably seven to twelve times, higher than that of the warp threads. This further enhances the radial flexibility of the entire lining tube.

In one embodiment, there are at least three tube layers that are configured in such a way that the lining tube can expand in diameter by between 5% and 50%, preferably between 10% and 20%, particularly preferably by 15%, between a pressureless state and a pressurized state of its interior without tearing or rupturing. This makes it possible to compensate as effectively as possible for the diameter fluctuations in the lining tube that usually occur as the lining tube is installed in a pressure pipeline. The pressurized state is a state in which a certain pressure is applied in the interior of the lining tube (depending on the selected outer diameter) so that the lining tube fits tightly against an inner wall of the pipe to be rehabilitated.

If the lining tube (in the pressurized/expanded state) has an outer diameter of between 100 mm and 1000 mm, it is as versatile as possible in terms of its use in existing pressure pipelines.

In one embodiment, the weft threads and/or the warp threads (and/or all other components of the lining tube) are resistant to fluids (in particular those that are extracted or that occur during petroleum extraction), preferably crude oil and/or fuels produced from crude oil, such as petrol or diesel, and/or other products refined from crude oil, and/or aggressive industrial waste water. The weft threads and the warp threads are not weakened by exposure to crude oil or fuels produced from crude oil. This makes the lining tube as versatile as possible.

The weft threads can contain fibers that are made of polyphenylene sulphide (PPS) or are themselves made entirely of polyphenylene sulphide (PPS). This forms a lining tube that is as versatile as possible.

If the weft threads and/or the warp threads (and/or all other components of the lining tube) are resistant to temperatures up to 80° C., further preferably to temperatures up to 120° C., the range of applications of the lining tube, especially in the oil and gas industry, is further extended. For example, the weft threads and the warp threads are not weakened by extended exposure to temperatures of up to 120° C. All in all, this provides an aging-resistant lining tube.

As an alternative to the application of the lining tube for conveying crude oil and petroleum products as described above, the lining tube is used in another embodiment to convey fresh (cold) water in drinking water pipelines. The weft threads can be made of PBT, PET, PA and/or PES. In this case, the weft threads should have an elasticity of at least 40%.

With regard to the inner and outer tube layers, it has also proven beneficial for efficient production if a material of the inner tube layer and/or a material of the outer tube layer is a polymeric, preferably thermoplastic, material.

With regard to the material of the inner tube layer, it is advantageous for economical production if the thermoplastic material of the inner tube layer is selected from the group consisting of polyolefin, polyamide, polyether, polyester, polyurethane, fluoropolymers, such as polyvinylidene fluoride, or mixtures thereof.

With regard to the material of the outer tube layer, it is advantageous for economical production if the thermoplastic material is selected from the group consisting of: polyolefin, polyamide, polyether, polyester, polyurethane, fluoropolymers, such as polyvinylidene fluoride, and mixtures thereof.

If the warp threads contain fibers made of aromatic polyamide (aramid), a copolymer of aromatic polyamide, basalt, carbon and/or glass fiber or consist entirely of aramid, a aramid copolymer, basalt, carbon and/or glass fiber, these warp threads can also be produced as efficiently as possible.

The relevant tube layers (the inner tube layer, the middle tube layer and the outer tube layer) are preferably in contact with each other. In particular, the tube layers are in contact with each other via their jacket surfaces (inner jacket surface and/or outer jacket surface).

In one embodiment, the inner tube layer and/or the outer tube layer has a thickness of between 1 mm and 4 mm, preferably a thickness of approximately 2 mm.

If the lining tube has a length of between 1,000 m and 4,000 m, the longest possible sections of pressure pipelines or existing fluid pipelines can be completed in a one-off operation (without interruption and without intermediate connections).

The warp thickness of the fabric should be at least 4000 dtex and at most 15000 dtex. The warp thread thickness of the lining tube should be at least 6000 dtex and at most 12000 dtex. The weft thickness of the fabric should be at least 15000 dtex and at most 25000 dtex.

Furthermore, the invention relates to a pressure pipeline section for conveying fluid, having an outer pipe, preferably made of metal, such as steel, and a lining tube that is in contact with the outer pipe from the inside, according to at least one of the embodiments described above.

In addition, the invention relates to a method for rehabilitating an existing fluid line that has already been laid. The lining tube according to an embodiment described above is first drawn into the existing fluid line. The lining tube is then subjected to an internal pressure in such a way that the lining tube is pressed against the existing fluid line from the inside.

The invention also relates to a method for supplementing a newly laid pressure pipeline including the steps: providing a pressure pipeline; and pulling a lining tube according to an embodiment described above into the pressure pipeline.

The term fluid is generally used to concretely describe a medium that does not resist shearing, however slow. The generic term fluid refers to gases and liquids because most physical laws apply equally to both aggregate states and many of the properties differ only quantitatively, not qualitatively.

Woven fabrics are generally understood to be flat textile products made of at least two thread systems crossed at right angles, with the so-called warp thread running in the longitudinal direction and the so-called weft thread running perpendicular to the warp thread.

Figure 4:
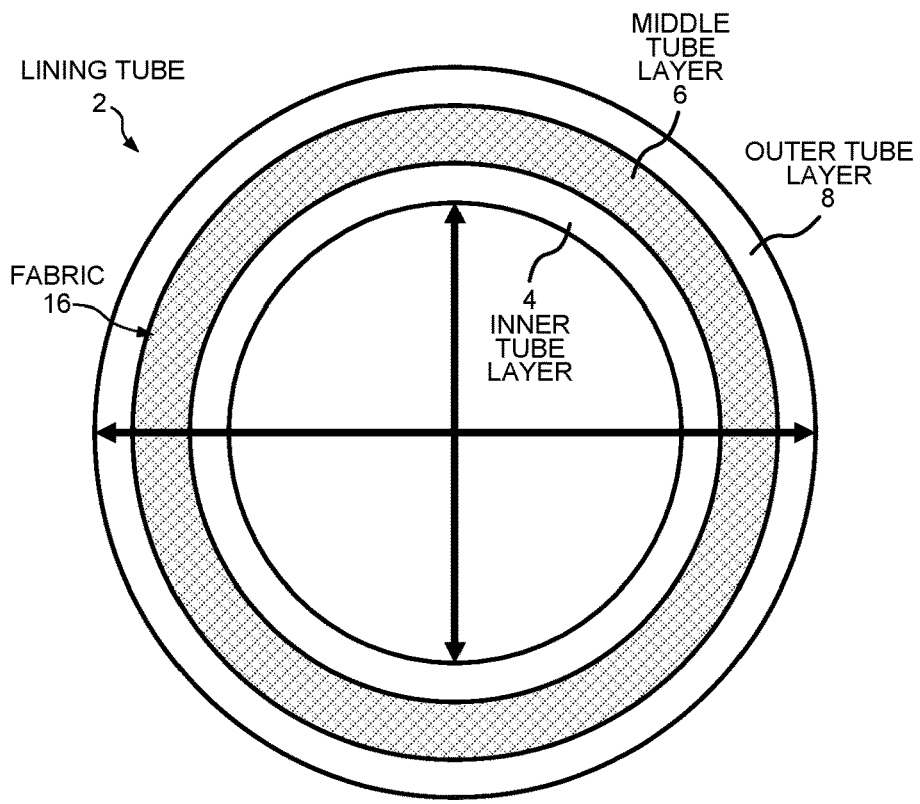
FIG. 4 is a schematic representation of the three-layer structure implemented in the lining tube of FIG. 1.

FIGS. 1 and 4 show a lining tube 2 having a three-layer structure that includes an inner tube layer 4, a middle tube layer 6, and an outer tube layer 8. The middle tube layer 6 is made of a fabric 16. The lining tube 2 is used, as explained below in connection with FIG. 5, for the internal coating of a new pressure pipeline section 18, for supplementing and reinforcing pressure pipelines that have already been laid, or alternatively for rehabilitating existing fluid lines that have already been laid and have lost strength, for example due to corrosion. In one embodiment, the fabric 16 of the middle tube layer 6 is impregnated with a curable resin. For example, the resin can be cured using pressure, heat (steam), or ultra-violet light.

FIG. 4 is a cross sectional view of the lining tube 2 showing the inner tube layer 4, the fabric 16 of the middle tube layer 6, and the outer tube layer 8.

The lining tube 2 exhibits an overall flexible structure. The lining tube 2 can be wound onto a transport spool before being inserted into a pressure pipeline. The lining tube 2 is flexible in such a way that it is collapsed in the transportation state. In the transportation state, at least two opposing inner circumferential areas of the lining tube 2 are in contact with each other. The lining tube 2 is folded into a double-walled U-shape in the usual way.

The inner tube layer 4 exhibits a high degree of impermeability and resistance to the fluid being transported through the pressure pipeline. The inner tube layer 4 protects and isolates the middle tube layer 6 from the inside of the tube.

In an application of the lining tube 2 in pressure pipelines that carry crude oil, the material of the inner tube layer 4 is a flexible thermoplastic, in this case a thermoplastic polyurethane. In other embodiments, other materials such as polyolefin, polyamide, polyether, polyester, fluoropolymers such as polyvinylidene fluoride, or mixtures thereof are also used as the material for the inner tube layer 4.

In the case of water pipelines, flexible polyethylene is preferably used for the material of the inner tube layer 4.

The outer tube layer 8 has the function of protecting the middle tube layer 6 from external influences. This includes in particular the mechanical stress when pulling in the tube and the influence of weathering, for example moisture and microorganisms. Flexible thermoplastic material is preferably used as the material for the outer tube layer 8. Depending on the intended use and surface condition of the inner circumferential wall of the pipe to be rehabilitated, polyethylene (m-LLD-PE, LLD-PE, LD-PE and MD-PE), polypropylene, thermoplastic polyurethane or soft PVC can be used as the thermoplastic material to make the outer tube layer 8. Polyolefin, polyamide, polyether, polyester, polyurethane, fluoropolymers, such as polyvinylidene fluoride, or mixtures thereof can also be used for the material for the outer tube layer 8.

Figure 2:
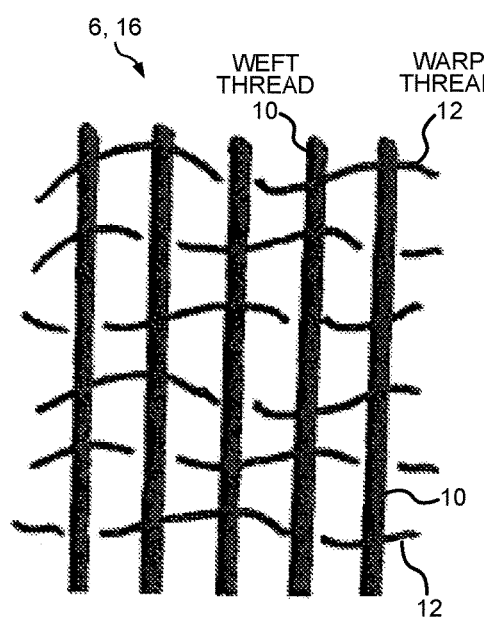
FIG. 2 is a detailed view of a fabric used in the lining tube of FIG. 1, showing warp and weft threads.

The fabric 16 of the lining tube 2 disposed in the central tube layer 6 is woven on a circular loom from weft threads 10 and warp threads 12, as shown in more detail in FIG. 2. The weft threads 10 run in the circumferential direction of the lining tube 2, and the warp threads 12 run in the longitudinal direction of the lining tube 2. For the warp threads 12, high-strength and high-modulus fibers in high thread strength and high weave density made of aramid are used. In further embodiments, the material of the warp threads 12 varies, whereby alternatively fibers of aramid copolymer, basalt, carbon, and/or glass fiber are used, or the warp threads 12 are made entirely of these fibers.

The weft threads 10 are made of a different material to that of the warp threads 12. The weft threads 10 exhibit a greater elasticity, i.e., a higher non-destructive stretchability, than the warp threads 12. This makes it possible to adapt the diameter of the lining tube 2 to the fluctuating diameter conditions of the pressure pipeline or existing fluid pipeline.

In the example shown in FIGS. 1 and 2, the weft threads 10 are made entirely of a polyphenylene sulphide. This results in a high-performance and aging-resistant lining tube 2, which is designed to be both resistant to fluids conveyed during petroleum extraction, in particular crude oil, and resistant to temperatures of up to 120° C., without the weft threads 10 being damaged or tearing.

In another application, the lining tube 2 can also be used for pumping cold fresh water and drinking water. For this application, plastic materials in the form of PBT, PET, PA or PES have proven to be suited for the weft threads 10.

Figure 3:
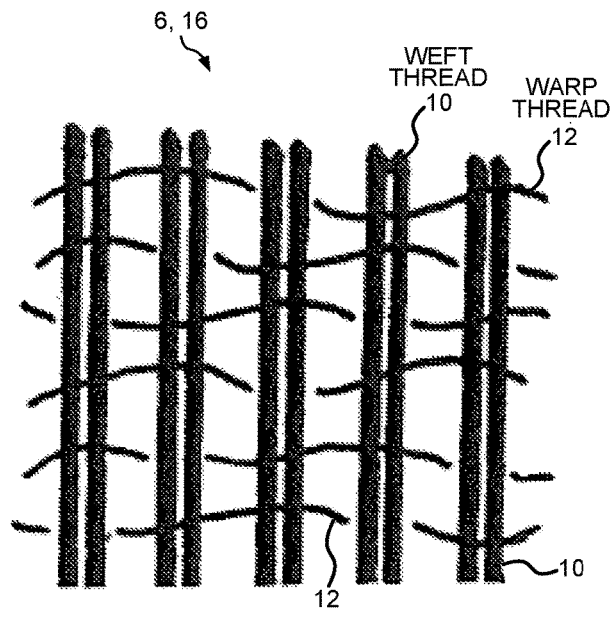
FIG. 3 is a detailed view of an alternative fabric used in the lining tube of FIG. 1, showing alternative warp and weft threads.

FIG. 3 shows another embodiment in which the fabric 16 of the middle tube layer 6 is woven with double weft threads 10 and/or with double warp threads 12. In this respect, reference is made to EP0535203B1, which discloses a circular loom with continuous strand lift that could be used to produce a particularly high-quality fabric 16 of middle tube layer 6.

In addition, the lining tube 2 can include tube layers 4, 6, 8 that are each provided multiple times. In further embodiments, there are therefore more than one inner tube layer 4 and/or more than one outer tube layer 8 and/or more than one middle tube layer 6.

Figure 5:
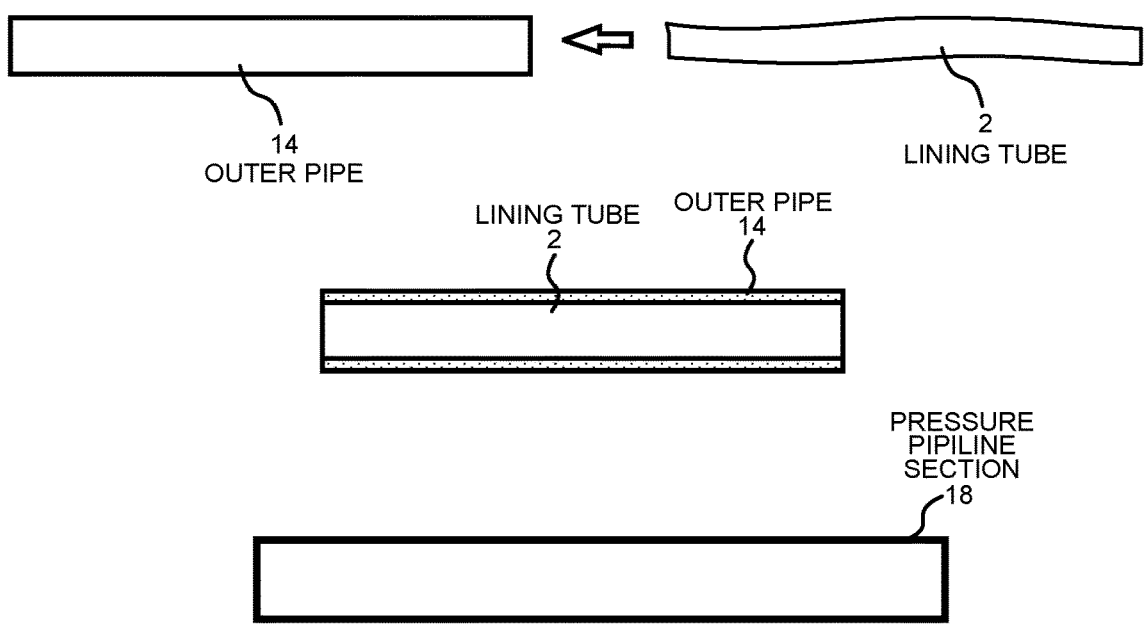
FIG. 5 is a schematic representation of a workflow for manufacturing a pressure pipeline section using the lining tube of FIG. 1.

FIG. 5 schematically illustrates a method for manufacturing a pressure pipeline section 18. In a first step, an outer pipe 14 is provided, preferably in the form of a steel pipe. The lining tube 2 is also provided, as shown in the upper portion of FIG. 5.

Then in a second step, the lining tube 2 is drawn into the outer pipe 14, as shown in the middle portion of FIG. 5. The lining tube 2 is preferably collapsed in its cross-sectional shape to facilitate its being drawn into the outer pipe 14.

Finally, in a third step, the lining tube 2 is pressurized and expanded from the inside so that the lining tube 2 unfolds and (with its outer tube layer 8) presses in its fully expanded state against the inside surface of the outer pipe 14, forming the finished pressure pipeline section 18. While the lining tube 2 is pressurized and pressed against the inside surface of the outer pipe 14, the resin-impregnated lining tube cures and hardens. Thus, the lining tube is maintained in a pressurized state using the pressurized air until the resin in the lining tube cures and hardens. In the finished pressure pipeline section 18 after the pressurized air is removed and the lining tube 2 is cured, the outer tube layer 8 remains in contact with the inside surface of the outer pipe 14. The lining tube 2 is capable of expanding in diameter by 5% to 50% from its pressureless state to its pressurized state without tearing or rupturing.

In this respect, it should be noted that in the case of a method for reinforcing/supplementing a new pressure pipeline or for rehabilitating an existing fluid pipeline, the procedure is the same. In the first step, the pressure pipeline or the existing fluid line is in this case available as an XYZ system. In addition, the lining tube 2 is provided in the same length or in a greater length than the pressure pipeline or existing fluid line.

In the second step, the lining tube 2 is pulled into the pressure pipeline or the existing waste fluid line that has already been laid underground. In the third step, the lining tube 2 is pressurized and thus presses against the inside surface of the pressure line or the existing fluid line.

FIG. 6 is a table that summarizes the structure and composition of an embodiment of the lining tube 2.

REFERENCE NUMERALS 2 lining tube
4 inner tube layer
6 middle tube layer
8 outer tube layer
10 weft thread
12 warp thread
14 outer pipe
16 fabric
18 pressure pipeline section Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A lining tube for rehabilitating fluid-carrying systems, comprising:
    an inner tube layer;
    an outer tube layer; and
    a middle tube layer that includes a seamless fabric formed from warp threads and weft threads, wherein the warp threads run in a longitudinal direction relative to the lining tube, wherein the weft threads run in a circumferential direction relative to the lining tube, wherein the weft threads are made of a first material and the warp threads are made of a second material, and wherein the first material has a material elasticity greater than that of the second material.

2. The lining tube of claim 1, wherein the weft threads exhibit an elasticity that is two to twenty times greater than that of the warp threads.

3. The lining tube of claim 1, wherein the lining tube is capable of expanding in diameter by 5% to 50% from a pressureless state to a pressurized state without tearing or rupturing.

4. The lining tube of claim 1, wherein the lining tube has an outer diameter of 100 mm to 1,000 mm.

5. The lining tube of claim 1, wherein the weft threads and the warp threads are not weakened by exposure to crude oil or fuels produced from crude oil.

6. The lining tube of claim 1, wherein the weft threads contain fibers that include polyphenylene sulphide.

7. The lining tube of claim 1, wherein the weft threads and the warp threads are not weakened by extended exposure to temperatures of up to 120° C.

8. The lining tube of claim 1, wherein the inner tube layer and the outer tube layer are made of a polymeric material.

9. The lining tube of claim 1, wherein the warp threads contain fibers that include a material selected from the group consisting of: aromatic polyamide, a copolymer of aromatic polyamide, basalt, carbon, and glass fiber.

10. A pipeline section, comprising:
    an outer pipe with an inside surface; and
    a lining tube, wherein the lining tube comprises:
        an inner tube layer;
        an outer tube layer; and
        a middle tube layer that includes a fabric formed from warp threads and weft threads, wherein the warp threads run in a longitudinal direction relative to the lining tube, wherein the weft threads run in a circumferential direction relative to the lining tube, wherein the weft threads are made of a first material and the warp threads are made of a second material, wherein the first material has a material elasticity greater than that of the second material, and wherein the outer tube layer contacts the inside surface of the outer pipe.

11. The pipeline section of claim 10, wherein the weft threads exhibit an elasticity that is two to twenty times greater than that of the warp threads.

12. The pipeline section of claim 10, wherein the inside surface of the outer pipe has a diameter of 100 mm to 1,000 mm.

13. The pipeline section of claim 10, wherein the pipeline section transports crude oil or fuels produced from crude oil.

14. The pipeline section of claim 10, wherein the weft threads contain fibers that include polyphenylene sulphide.

15. The pipeline section of claim 10, wherein the weft threads and the warp threads are not weakened by extended exposure to temperatures of up to 120° C.

16. The pipeline section of claim 10, wherein the inner tube layer and the outer tube layer are made of a polymeric material.

17. The pipeline section of claim 10, wherein the warp threads contain fibers that include a material selected from the group consisting of: aromatic polyamide, a copolymer of aromatic polyamide, basalt, carbon, and glass fiber.

18. A method for retrofitting a pipeline, comprising:
pulling a lining tube into the pipeline;
expanding the lining tube using pressurized air so as to press an outer tube layer of the lining tube against an inside surface of the pipeline; and
maintaining the lining tube in a pressurized state using the pressurized air until a resin in the lining tube cures and hardens, wherein the outer tube layer remains in contact with the inside surface of the outer pipe even after the pressurized air is removed, wherein the lining tube comprises an inner tube layer, the outer tube layer, and a middle tube layer, wherein the middle tube layer includes a fabric formed from warp threads and weft threads, wherein the warp threads run in a longitudinal direction relative to the lining tube, wherein the weft threads run in a circumferential direction relative to the lining tube, and wherein are made of a first material and the warp threads are made of a second material, wherein the first material has a material elasticity greater than that of the second material.

19. The method of claim 18, wherein the weft threads exhibit an elasticity that is two to twenty times greater than that of the warp threads.

20. The method of claim 18, wherein the pipeline transports crude oil or fuels produced from crude oil.

* * * * *